(12) United States Patent
Ayadat et al.

(10) Patent No.: US 11,225,767 B1
(45) Date of Patent: Jan. 18, 2022

(54) EARTHEN DAM STRUCTURE

(71) Applicant: Prince Mohammad Bin Fahd University, Dhahran (SA)

(72) Inventors: Tahar Ayadat, Dhahran (SA); Andi Asiz, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 17/464,215

(22) Filed: Sep. 1, 2021

(51) Int. Cl.
| | |
|---|---|
| *E02B 7/06* | (2006.01) |
| *E02B 3/10* | (2006.01) |
| *E02D 17/18* | (2006.01) |
| *E02D 15/00* | (2006.01) |

(52) U.S. Cl.
CPC .......... *E02B 7/06* (2013.01); *E02B 3/10* (2013.01); *E02D 15/00* (2013.01); *E02D 17/18* (2013.01); *E02D 2201/04* (2013.01); *E02D 2250/00* (2013.01); *E02D 2300/0003* (2013.01); *E02D 2300/0039* (2013.01)

(58) Field of Classification Search
CPC ..... E02B 7/02; E02B 7/04; E02B 7/06; E02B 7/08; E02D 17/18
See application file for complete search history.

(56) References Cited

U.S. PATENT DOCUMENTS

| | | | | | |
|---|---|---|---|---|---|
| 1,825,969 | A | * | 10/1931 | McClintock | ............ B28B 11/06 264/151 |
| 1,997,132 | A | * | 4/1935 | Collorio | .................... E02B 7/06 405/109 |
| 4,266,885 | A | * | 5/1981 | Naito | ........................ E02B 7/06 405/109 |
| 4,288,175 | A | | 9/1981 | Baker et al. | |
| 5,795,106 | A | | 8/1998 | Herd | |
| 6,612,779 | B1 | * | 9/2003 | Scuero | .................... E02D 17/18 405/107 |

(Continued)

FOREIGN PATENT DOCUMENTS

| | | | |
|---|---|---|---|
| BR | 202019012042-3 U2 | 12/2020 | |
| CN | 101519293 A | 9/2009 | |
| CN | 106381880 A * | 2/2017 | ............. C04B 38/08 |

(Continued)

OTHER PUBLICATIONS

Arin Yilmaz, et al., "Possibility of using waste tire rubber and fly ash with Portland cement as construction materials", Waste Management, vol. 29, 2009, pp. 1541-1546.

(Continued)

*Primary Examiner* — Frederick L Lagman
(74) *Attorney, Agent, or Firm* — Oblon, McClelland, Maier & Neustadt, L.L.P.

(57) ABSTRACT

The present disclosure discloses an earthen dam structure including a core wall that includes a homogeneous mixture of clay, sand, powdered tire rubber and Portland cement. Additionally, the core wall contains the powdered tire rubber in an amount sufficient to increase a modulus of elasticity of the core wall to over 10 MPa while keeping a hydraulic conductivity of the core wall under 100 feet/year. The earthen dam structure further includes an upstream embankment portion and a downstream embankment portion, each positioned adjacent to the core wall, and a spillway configured to prevent water from overtopping a crest of the core wall.

18 Claims, 4 Drawing Sheets

(56) References Cited

U.S. PATENT DOCUMENTS

| | | | | |
|---|---|---|---|---|
| 6,867,249 B2* | 3/2005 | Lee | ……………… | E01C 7/142 |
| | | | | 524/4 |
| 7,500,806 B2* | 3/2009 | Higgins | ……………… | E02B 7/06 |
| | | | | 209/910 |

FOREIGN PATENT DOCUMENTS

| | | | | | |
|---|---|---|---|---|---|
| CN | 106638485 | A | | 5/2017 | |
| CN | 107524120 | A | * | 12/2017 | |
| CN | 107700435 | A | * | 2/2018 | |
| CN | 111979984 | A | * | 11/2020 | |
| DE | 44 31 336 | A1 | | 9/1995 | |
| GB | 2206345 | A | * | 1/1989 | …………… C04B 38/08 |
| JP | 62045809 | A | * | 2/1987 | …………… A61H 7/008 |
| JP | 63011708 | A | * | 1/1988 | |
| SU | 1372000 | A1 | * | 2/1988 | |
| SU | 1544873 | A1 | * | 2/1990 | |

OTHER PUBLICATIONS

Erdal COKCA, et al., "Use of rubber and bentonite added fly ash as a liner material", Waste Management, vol. 24, 2004, pp. 153-164.

* cited by examiner

EARTHEN DAM STRUCTURE

BACKGROUND

Technical Field

The present disclosure is directed to an earthen dam structure. More specifically, the present disclosure relates to a core wall and/or core wall structure of the earthen dam structure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Earthen dams are hydraulic structures constructed across a river or natural stream to store water on an upstream side thereof. Thus, an earthen dam structure retards the flow of water and hence may be inherently vulnerable to adverse erosion on a downstream side when an impounded upstream reservoir of water overtops a crest of the earthen dam structure. Such overtopping of water may erode longitudinal flow pathways resulting in progressively deeper cuts into the downstream side which eventually breaches an embankment of the earthen dam structure, thereby causing not only severe damage to the embankment but also flooding of the downstream valley. Additionally, water leakage through the earthen dam structure may cause a decrease in the quantity of stored water on the upstream side and may risk stability of the earthen dam structure.

Various references describe earthen dam structures and materials which can be used to build the earthen dam structure. CN106638485A discloses a rubber dam, such as a rubber core wall rock-fill dam. The rubber dam includes a core wall, rubber pile stones, rocks, a panel, and rubber particles. The rubber pile stones are a mixture of the rocks and the rubber particles. The core wall may include clay.

U.S. Pat. No. 5,795,106A discloses a retaining wall system comprising a plurality of scrap tire bales arranged to define a retaining wall structure. A structural material is positioned or applied about the scrap tire bales in order to provide a continuous retaining wall structure serving to retain water, control erosion, support buildings and associated structures, provide a barrier or fence, or perform other similar functions. The scrap tire bales are arranged in a series of layers on either side of a dam.

DE4431336A1 discloses a mold material composition including powdered tire material, one or more resins, and chemicals selected from the group of acetone, caustic soda, glass wool, ammonium phosphate, starch, and pigment.

CN101519293A discloses a rubber cement soil including waste rubber particles, cement, water, and sand, and a corresponding a preparation method.

BR202019012042U2 discloses modular advertising bricks aggregated with residual materials of tires and marble and the modular advertising bricks may also include clay.

Yilmaz et al. ("Possibility of using waste tire rubber and fly ash with Portland cement as construction materials", Waste Management, 29, 1541, 2009) investigated the possibility of using fly ash and rubber waste with Portland cement as construction material.

Cokcaa et al. ("Use of rubber and bentonite added fly ash as a liner material", Waste Management, 24, 153, 2004) studied a liner material including fly ash (90 wt %), bentonite and powdered tire.

Each of the aforementioned references suffers from one or more drawbacks hindering their adoption. For example, although the rubber particles disclosed in CN106638485A may be obtained by crushing/grounding waste tires to achieve a grain diameter of less than 10 mm, this reference does not disclose any binding agent to provide stability for the structure. Further, the core wall described in CN106638485A includes two portions, namely a first portion formed by the rubber pile stones and a second portion formed by the rocks. Such configuration of the core wall may allow seepage of water, thereby risking the stability of the structure. U.S. Pat. No. 5,795,106A does not disclose a binding agent to keep the separate layers intact. Further, the mold material composition disclosed in DE4431336A1 includes resins, pigments, and chemicals of acidic nature which may cause erosion internally, thereby degrading the stability of the core wall. The remaining references do not disclose sufficient material composition to overcome infiltration or leakage. Accordingly, there is a need for an earthen dam structure that is economically constructed, structurally stable and resists water leakage.

SUMMARY

In an exemplary embodiment, an earthen dam structure is disclosed. The earthen dam structure includes a core wall that includes a homogeneous mixture of clay, sand, powdered tire rubber and Portland cement. An amount of the powdered tire rubber contained in the core wall is sufficient to increase a modulus of elasticity of the core wall to over 10 MPa while keeping a hydraulic conductivity of the core wall under 100 feet/year. The earthen dam structure further includes an upstream embankment portion and a downstream embankment portion, each positioned adjacent to the core wall, and a spillway configured to prevent water from overtopping a crest of the core wall.

In an embodiment, the core wall is positioned in a center of the earthen dam structure or upstream from the center of the earthen dam structure. In an embodiment, the core wall has a trapezoid shape in a vertical cross section. The trapezoid shape has a top side, a bottom side, a left side, and a right side, where the top side is parallel to the bottom side and the top side is shorter than the bottom side. In an exemplary embodiment, the top side has a length of about 5 meters, the left side has a slope of 0.1 to 0.3, and the right side has a slope of 0.1 to 0.3. In an embodiment, in the core wall, the clay has a weight fraction of 50-60%; the sand has a weight fraction of 10-15%; the powdered tire rubber has a weight fraction of 15-30%; and the Portland cement has a weight fraction of 10-15%.

In an embodiment, the upstream embankment portion has a slope of about 3 and the downstream embankment portion has a slope of about 2.5. In an embodiment, at least one of the upstream embankment portion and the downstream embankment portion covers a crest of the core wall.

In an embodiment, the core wall includes a plurality of stacked clay bricks that include clay, powdered tire rubber and Portland cement. In an embodiment, in the plurality of clay bricks, the clay has a weight fraction of 60-70%; the powdered tire rubber has a weight fraction of 15-30%; and the Portland cement has a weight fraction of 10-15%.

In an embodiment, the plurality of clay bricks is formed by a stiff mud process. In an embodiment, the stiff mud process includes forcing a clay mixture through a die to form a continuous clay band, where the clay mixture includes 15-30 wt % of powdered tire rubber, 10-15 wt % of Portland cement and mud that has a clay content of 50-70 wt %. The stiff mud process further includes cutting the continuous clay band into separate clay bricks, drying the separate clay bricks below a degradation temperature of the powdered tire rubber to form dried clay bricks, baking the dried clay bricks below the degradation temperature of the powdered tire rubber to form hardened clay bricks, and cooling the hardened clay bricks to form the plurality of clay bricks.

In an embodiment, forming the plurality of clay bricks further includes drying the separate clay bricks at a temperature of 45-150° C. for 24-48 hours and baking the dried clay bricks at about 200° C. for 6 to 9 hours under a pressure of 1.2 MPa to 1.6 MPa in an autoclaving boiler.

In an embodiment, the earthen dam structure further includes a liner system adjacent to the core wall and configured to isolate waste or leachate from the environment. In an embodiment, the liner system includes sand, bentonite, powdered tire rubber, lime and fly ash. In an embodiment, in the liner system, the sand has a weight fraction of 10-15%; the bentonite has a weight fraction of 40-60%; the powdered tire rubber has a weight fraction of 10-20%; the lime has a weight fraction of 5-10%; and the fly ash has a weight fraction of 10-30%.

In an embodiment, the earthen dam structure further includes a first transition filter located between the upstream embankment portion and the core wall and a second transition filter located between the downstream embankment portion and the core wall.

In an embodiment, the earthen dam structure includes a foundation section having sand and/or compacted fill sufficient to vertically and horizontally support a bottom portion of the core of the dam. In an embodiment, the earthen dam structure further includes a horizontal blanket between the foundation section and the upstream embankment portion. The horizontal blanket is connected to the core wall and configured to reduce seepage through the foundation section. In an embodiment, the earthen dam structure further includes a cut-off trench configured to reduce seepage through the foundation section, where a center line of the cut-off trench lies within a base of the core wall. In an embodiment, the cut-off trench extends into the foundation section.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values in between.

Aspects of the present disclosure are directed to an earthen dam structure built from clay bricks manufactured from construction materials, having new chemical composition. The clay bricks are capable of improving physical and mechanical properties of the earthen dam structure, while achieving economic and environmental benefits.

Figure 1:
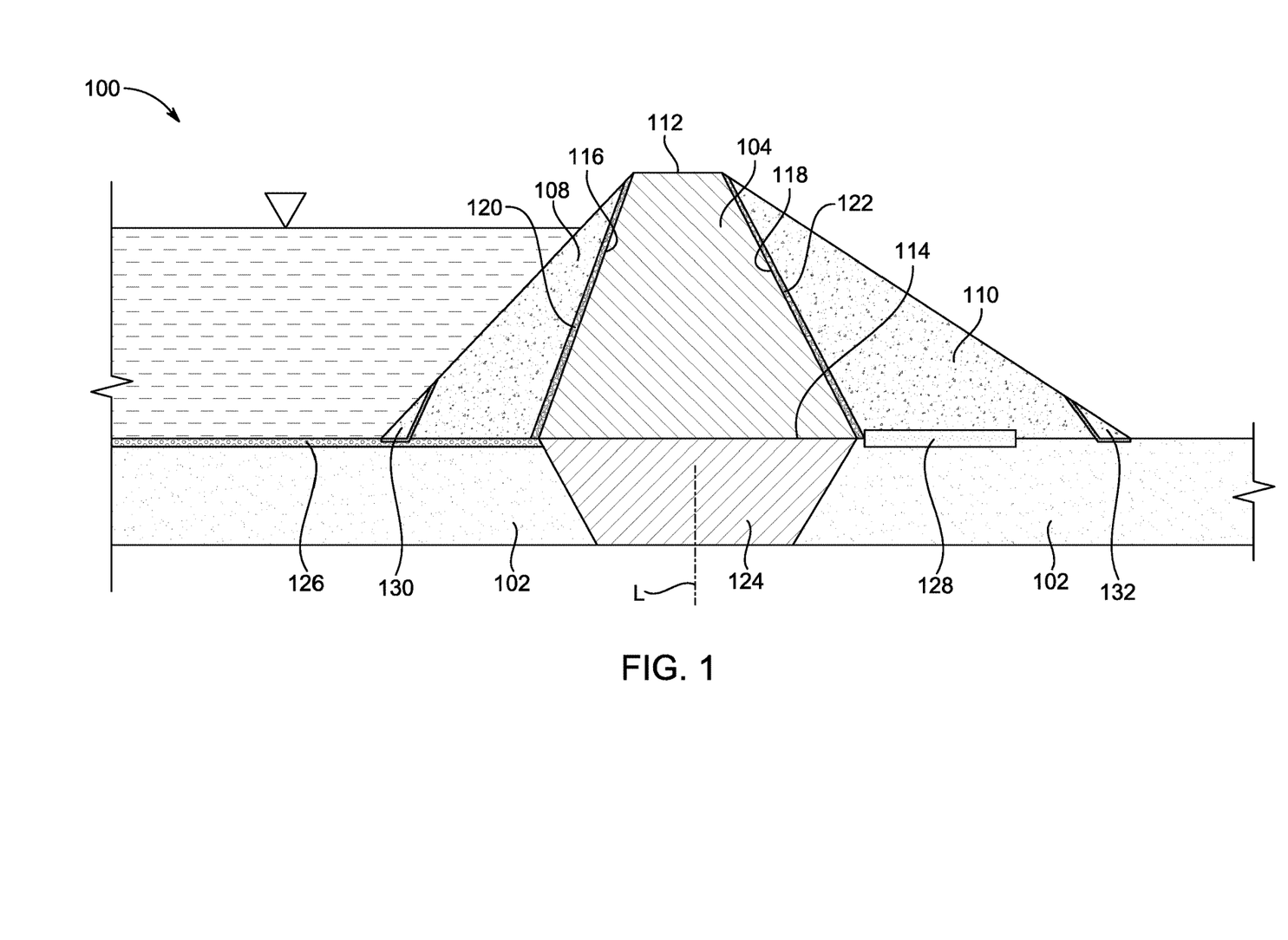
FIG. 1 is an exemplary cross-sectional view of an earthen dam structure, according to certain embodiments of the present disclosure.

Referring to FIG. 1, an exemplary cross-sectional view of an earthen dam structure 100 is illustrated. The earthen dam structure 100 may include a foundation section 102 functioning to support the core and/or the same and preferably formed of compacted fill or other impervious rock and soil. The earthen dam structure 100 includes a core wall 104 preferably positioned over the foundation section 102. According to an aspect of the present disclosure, the core wall 104 includes a homogeneous mixture of clay, sand, powdered tire rubber and Portland cement. In an embodiment, in the core wall 104, a weight fraction of the clay may be in a range of 50% to about 70%, preferably 55%-65%, preferably about 60%; a weight fraction of sand may be in a range of about 10% to about 15%, preferably about 13%; a weight fraction of the powdered tire rubber may be in a range of about 15% to about 30%, preferably 20%-25%, preferably 22.5%; and a weight fraction of the Portland cement may be in a range of about 10% to about 15%, preferably 12.5%, wherein the weight fraction is based on the total weight of the core wall composition.

In an embodiment, the earthen dam structure 100 can be built using a plurality of clay bricks 106 (shown in FIG. 2), where each clay brick 106 includes, but not limited to, clay, powdered tire rubber and Portland cement. In one embodiment, the core wall 104 includes a plurality of stacked clay bricks 106. Weight fraction of each component in the clay brick may be predetermined to achieve stability of the core wall 104. For instance, a weight fraction of the clay may be in a range of about 60% to about 70%, preferably 63%-67%, preferably about 65%; a weight fraction of the powdered tire rubber may be in a range of about 15% to about 30%, preferably 20%-25%, preferably about 22.5%; and a weight fraction of the Portland cement may be in a range of about 10% to about 15%, preferably about 12.5%. Further, a weight fraction of sand in the core wall 104 may be in a range of about 10% to about 15%, preferably about 12.5%. Additionally, the clay bricks 106 may include other elements as discussed in Table-1 below. The chemical composition and physical properties of each component listed in the Table-1 should not be considered limiting.

TABLE-1

| Component | Chemical composition (weight fraction %) | Physical properties |
|---|---|---|
| Clay | $SiO_2$ = 50% to 60%;<br>$Al_2O_3$ = 35% to 40%;<br>$Fe_2O_3$ = 0.5% to 1.5%;<br>MgO = 0% to 1%;<br>CaO = 0% to 0.5%;<br>$K_2O$ = 1% to 2%;<br>$TiO_2$ = 0% to 1%; and<br>$P_2O_5$ = 0.1% to 0.5% | Specific gravity ($G_s$) = 2.5-2.65;<br>Liquid Limit (LL) = 40%-50%;<br>Plastic Limit (PL) = 20%-25%;<br>Unit weight ($\gamma$) = 15.0-16.5 $kN/m^3$;<br>Permeability < $10^{-9}$ m/s;<br>Classification = CL |
| Sand | $SiO_2$ = 60% to 80%, preferably 65%-75%;<br>$Al_2O_3$ = 10% to 25%;<br>$Fe_2O_3$ = 0.5% to 4%;<br>MgO = 0.5% to 1.5%;<br>CaO = 2% to 5%; and<br>$SO_3$ = 0.2%-0.6% | Specific gravity ($G_s$) = 2.65-2.7;<br>Unit weight ($\gamma$) = 16.5-18.5 $kN/m^3$;<br>Silt size (≤75 μm) = 10%-20%;<br>Permeability $10^{-2}$ m/s < k < $10^{-5}$ m/s;<br>Classification = SW |
| Powdered tire rubber | Rubber = 50% to 60%;<br>Carbon black = 25% to 35%;<br>Textile = 0.1% to 5%;<br>Oxide Zinc = 0.1% to 5%;<br>Sulphur = 0.1% to 5%;<br>Additives = 5% to 15%% | Density = 0.85;<br>Size = less than 80 μm;<br>Elongation = 420% |
| Portland cement | Lime (CaO) = 60% to 67%;<br>Silica ($SiO_2$) = 17% to 25%;<br>Alumina ($Al_2O_3$) = 3% to 8%;<br>Iron oxide = 0.5% to 6%;<br>Alkalis ($K_2O$ + $Na_2O$) = 0.2% to 1.5%;<br>Magnesia = 0.1% to 1% | Specific gravity ($G_s$) = 3.15;<br>Consistency = 24;<br>Blaine's specific surface (cm2/kg) = 2415;<br>Initial setting time = 1 hour;<br>Final setting time = around 10 hours |

The core wall 104 contains the powered tire rubber in an amount sufficient to increase a modulus of elasticity of the core wall 104 to over 10 MPa, preferably 10-30 MPa, preferably 15-25 MPa, preferably about 20 MPa, while keeping a hydraulic conductivity of the core wall 104 under 100 feet/year, preferably less than 0.1, 0.01, 0.001, 0.0001, $10^{-5}$, $10^{-6}$, or $10^{-7}$ ft/day. A modulus of elasticity of conventional clay bricks with no added powered tire rubber is typically below 10 MPa, for example 3-6 MPa. The hydraulic conductivity, also commonly referred to an coefficient of permeability and/or at least partially dependent on the coefficient of permeability, is defined as an in-situ average rate at which a porous medium such as soil or rock can transmit water under unit hydraulic gradient and laminar flow conditions, in a given direction. For instance, a hydraulic conductivity of slit, clay or a mixture of sand, slit and clay is typically in a range of 0.1 feet/year to 100 feet/year and considered low. A hydraulic conductivity of massive clay can be smaller than 0.1 feet/year and considered very low [Bureau of Reclamation, U.S. Dep't of the Interior, Reclamation: Managing Water in the West 68 (2007), incorporated herein by reference in its entirety]. In some embodiments, the powdered tire rubber, also known as crumb rubber, with a particle size in a range of about 0.5 mm to about 1 mm, may be used to replace a weight fraction of the sand to manufacture the clay bricks 106, thereby reducing thermal conductivity of the clay bricks 106. The powdered tire rubber can provide water resistance with low absorption, low shrinkage, acid resistance, high impact resistance, and excellent thermal and sound insulation. With the above described composition, properties of the core wall 104 may be achieved as shown below:

(a) Modulus of elasticity (E)=10 MPa to 30 MPa;
(b) Permeability (k)≤$10^{-7}$ m/s;
(c) Unit weight ($\gamma$)=18 $kN/m^3$ to 21 $kN/m^3$;
(d) Absorption capacity <10%;
(e) Water seepage of the stream flow <0.1%; and
(f) Undrained shear strength ($c_u$)=50 kPa to 100 kPa.

In an embodiment, the clay bricks 106 may be formed by a stiff mud process that includes forcing a clay mixture through a die to form a continuous clay band. Among other constituents, the clay mixture may include clay, powdered tire rubber, and Portland cement. Weight fraction of the clay, the powdered tire rubber, and the Portland cement in the clay mixture may be substantially the same as described earlier. In an embodiment, a measured amount of water may be added to the clay mixture, for example with a water-to-cement ratio (w/c) of 0.3-0.7, preferably 0.4-0.6 or about 0.5, prior to forcing the clay mixture through a die that molds the clay mixture into desired shape and size. The stiff mud process further includes cutting the continuous clay band into separate clay bricks by a wire frame and drying the separate clay bricks below a degradation temperature of the powdered tire rubber to form dried clay bricks. Further, the stiff mud process includes baking the dried clay bricks below the degradation temperature of the powdered tire rubber to form hardened clay bricks and cooling the hardened clay bricks to form the plurality of clay bricks 106. In an embodiment, the separate clay bricks are dried at a temperature in a range of about 45° C. to about 150° C. for a duration of about 24 hours to about 48 hours. Subsequently, the dried clay bricks are baked at a temperature of about 200° C. for a duration of about 6 hours to about 8 hours under a pressure in a range of about 1.2 MPa to about 1.6 MPa in an autoclaving boiler. In some examples, baking of the dried bricks may be performed in any masonry oven, furnaces, tunnel kiln, or any other conventionally known brick baking apparatus. The baked clay bricks may be retained in the autoclave for about 1 hour during cooling stage to minimize shrinking process and prolong durability of the clay bricks 106. The quality of the clay bricks 106 depends not only on the quality of substrates used and diligence during particular stages of production, but also on the duration of autoclaving. In some embodiments, the duration of autoclaving may be prolonged to for example 8-9 hours. It is worth mentioning that conventionally dried bricks are typically baked in kilns at a very high temperature (e.g., 1000° C.) for about 40-150 h. However, such a high temperature degrades the powdered tire rubber and is not applicable to the clay bricks 106.

Preferably the bricks are interlocking such that when viewed from a front face each brick has a groove on a top side and an extension on the bottom side such that the bottom side extension is in contact with the top side groove of a neighboring brick one course lower. The groove and bottom surface of the brick form a continuous surface that is in continuous contact with the upper surface and extension of a neighboring brick. Likewise, each brick has an extension and/or groove on each side end that interlocks with a corresponding groove and/or extension from the side end of one or more neighboring bricks. Although bricks may have a conventional rectangular-faced form with single dimensions for length, width and height, preferably the brick has a complex shape such that the surface of the brick that faces the core wall has an extension having the length of 0.2-1.0 times, preferably 0.3-0.8, 0.4-0.7 or 0.5-0.6 times the length of the brick measured horizontally of the brick. The extension has a height that is the same as the height of the brick. The extension is preferably placed at a center point along the length of the brick. The extension may aid in anchoring the brick wall to a core wall which may separately be filled with a rubber particle-containing fill material. The bricks are preferably laid in an offsetting pattern such that extensions do not overlap on consecutive courses. Preferably the bricks are adhered to one another with a mortar that comprises rubber particles and clay. Bricks are preferably of substantial size and may weigh up to 25 tons, preferably up to 10 tons, 5 tons or 1 ton. Outside dimensions of length and height may be up to 2 m in length with a height that is 0.2-0.8 times the length, preferably 0.3-0.7, 0.4-0.6 or about 0.5 times the length of the brick. In its larger size the brick is placed by crane such that the stacked brick structure provides a substantial physical strength to the dam structure.

The stiff mud process using light-weight construction materials can reduce the dead load of the earthen dam structure 100 and reduce vibrations caused by earthquakes. Further, the clay bricks 106 manufactured in accordance with the present disclosure minimize energy consumption during the manufacturing process and reduce carbon-dioxide emission, thereby rendering the earthen dam structure 100 environmentally friendly and contributing to sustainable environment. Resistance to crack formation in the clay bricks 106 is dependent at least in part on the crystal structure of the clay. In some embodiments, clay minerals may include hydrated aluminum silicates that belong to the kaolin group. Under this circumstance, crack formation in the clay bricks 106 is negligible due to a lack of crystal structure expansion. As such, the clay bricks 106 may be strong and offer high heat resistance. In some embodiments, the clay bricks 106 of the present disclosure may be used for building, for example, but not limited to, any type of dam, any masonry structure, and landfills.

The earthen dam structure 100 further includes an upstream embankment portion 108 and a downstream embankment portion 110, each positioned adjacent to the core wall 104, such that the core wall 104 is located between the upstream embankment portion 108 and the downstream embankment portion 110. The core wall 104 embodies a trapezoid shape in a vertical cross-section, as shown in FIG. 1. The trapezoid shape has a top side 112, a bottom side 114, a left side 116 and a right side 118. The top side 112 is parallel to the bottom side 114, and the top side 112 is shorter than the bottom side 114. The upstream embankment portion 108 is located on the left side 116 of the core wall 104 and the downstream embankment portion 110 is located on the right side 118 of the core wall 104. Preferably, the core wall 104 is positioned at a center of the earthen dam structure 100 or upstream from the center of the earthen dam structure 100. In an embodiment, the upstream embankment portion 108 has a slope of about 3 and the downstream embankment portion 110 has a slope of about 2.5. Further, in an embodiment, the top side 112 of the core wall 104 may have a length of about 5 meters, and the left side 116 and the right side 118 of the core wall 104 may each have a slope in a range of about 0.1 to about 0.3. In an embodiment, a first transition filter 120 is provided between the upstream embankment portion 108 and the core wall 104 and a second transition filter 122 is provided between the downstream embankment portion 110 and the core wall 104. The first transition filter 120 and the second transition filter 122 are both configured to prevent particle migration and piping towards the core wall 104.

In an embodiment, the earthen dam structure 100 includes a foundation section 102 having, but not limited to, impervious rock and soil. The foundation section 102 can be arranged below the core wall 104, the upstream embankment portion 108, and the downstream embankment portion 110. Further, in some embodiments, a cut-off trench 124 of the earthen dam structure 100 is provided beneath the core wall 104 and extends into the foundation section 102, such that a center line "L" of the cut-off trench 124 is within a base, such as the bottom side 114, of the core wall 104. The cut-off trench 124 is configured to reduce seepage through the foundation section 102. Seepage refers to the movement of water from a reservoir on an upstream side of a dam to a downstream side of the dam (for example through an embankment portion or a foundation section). Seepage is preferably less than 0.01, 0.001, 0.0001 or 0.00001 times the volume of downstream flow. In some embodiments, the earthen dam structure 100 includes a horizontal blanket 126 configured to reduce seepage through the foundation section. The horizontal blanket 126 is located between the foundation section 102 and the upstream embankment portion 108 and extends no further than the core wall 104.

Additionally, in some embodiments, a liner system 128 is provided adjacent to the core wall 104. The liner system 128 may be continuous. For example, the liner system 128 can be arranged between the downstream embankment portion 110 and the foundation section 102 and adjacent to the core wall 104. The liner system 128 may further be in contact with the second transition filter 122. The liner system 128 can be configured to isolate waste or leachate from the environment, thereby protecting soil and ground water from pollution originating from landfills. In an embodiment, the liner system 128, among other constituents, includes sand, bentonite, powdered tire rubber and lime with fly ash. Weight fraction of each component in the liner system 128 may be predetermined. For example, the weight fraction of sand may be in a range of about 10% to about 15%; the weight fraction of bentonite may be in a range of about 40% to about 60%; weight fraction of powdered tire rubber may be in a range of about 10% to about 20%; weight fraction of lime may be in a range of about 5% to about 10%; and the weight fraction of fly ash may be in a range of about 10% to about 30%. Chemical composition and physical properties of components in the liner system 128 is listed in Table-2 below.

TABLE-2

| Component | Chemical composition (weight fraction %) | Physical properties |
|---|---|---|
| Sand | $SiO_2$ = 60% to 80%, preferably 65%-75%; $Al_2O_3$ = 10% to 25%; $Fe_2O_3$ = 0.5% to 4%; MgO = 0.5% to 1.5%; CaO = 2% to 5%; and $SO_3$ = 0.2%-0.6% | Specific gravity ($G_s$) = 2.65-2.7; Unit weight ($\gamma$) = 16.5-18.5 $kN/m^3$; Silt size (≤75 μm) = 10%-20%; Permeability $10^{-2}$ m/s < k < $10^{-5}$ m/s; Classification = SW |
| Powdered tire rubber | Rubber = 50% to 60%; Carbon black = 25% to 35%; Textile = 0.1% to 5%; Oxide Zinc = 0.1% to 5%; Sulphur = 0.1% to 5%; Additives = 5% to 15%% | Density = 0.85; Size = less than 80 μm; Elongation = 420% |
| Bentonite | CaO = 1% to 2%; $SiO_2$ = 45% to 70%; $Al_2O_3$ = 20% to 25%; $Fe_2O_3$ = 3.5% to 4.5%; MgO = 2% to 3%; $Na_2O$ = 2% to 3%; $K_2O$ = 0.5% to 1%; $TiO_2$ = 0.1% to 0.3%; $P_2O_5$ = 0% to 0.2% | Specific gravity ($G_s$) = 2.05-2.45; Liquid Limit (LL) = 150% to 300%; Plastic Limit (PL) = 60% to 90%; Shrinkage Limit (SL) = 50% to 70%; Free swell index = 150% to 200%; Swell pressure = 55 kPa to 75 kPa; Unit weight ($\gamma$) = 14.0-17.0 $kN/m^3$ |
| Lime | CaO = 75% to 95%; $SiO_2$ = 0.5% to 2.5%; $Al_2O_3$ = 0.3% to 2%; $Fe_2O_3$ = 0% to 2%; Alkalis ($K_2O + Na_2O$) = 0.4% to 0.6%; Magnesia = 0% to 0.5%; $SO_3$ = 0% to 0.5% | Specific gravity ($G_s$) = 2.0; Insoluble material < 1%; Heat stability < 7 mm; Shrinkage at 28days < 650 μm/m; Initial setting time > 60 min |
| Fly ash | $SiO_2$ = 35% to 55%; $Al_2O_3$ = 15% to 13%; $Fe_2O_3$ = 4% to 5%; $TiO_2$ = 1% to 1.5%; CaO = 0% to 10%; MgO = 0% to 4%; $K_2O$ = 0.5% to 2%; $Na_2O$ = 0.5% to 2% | Specific gravity ($G_s$) = 2.10-2.65; Liquid Limit (LL) = 40% to 50%; Silt size (≤75 μm) = 85%-90%; Unit weight ($\gamma$) = 10.5-14.0 $kN/m^3$ |

In some embodiments, the liner system 128 may include one or more geomembranes, for example, but not limited to, high-density polyethylene (HDPE), linear low-density polyethylene (LLDPE), polyvinyl chloride (PVC), flexible polypropylene (fPP), chlorosulfonated polyethylene (CSPE), ethylene propylene diene terpolymer (EPDM), or combinations thereof.

In some embodiments, the earthen dam structure 100 also includes an upstream toe 130 located at a bottom region of the upstream embankment portion 108. The upstream toe 130 may contact the horizontal blanket 126 or directly contact the foundation section 102. Similarly, a downstream toe 132 can be located at a bottom region of the downstream embankment portion 110 and contact the foundation section 102. In an embodiment, the upstream toe 130 and the downstream toe 132 may each be made of layers including, but not limited to, fine sand, coarse sand, gravel, and rock, to prevent seepage of water into the foundation section 102.

Figure 2:
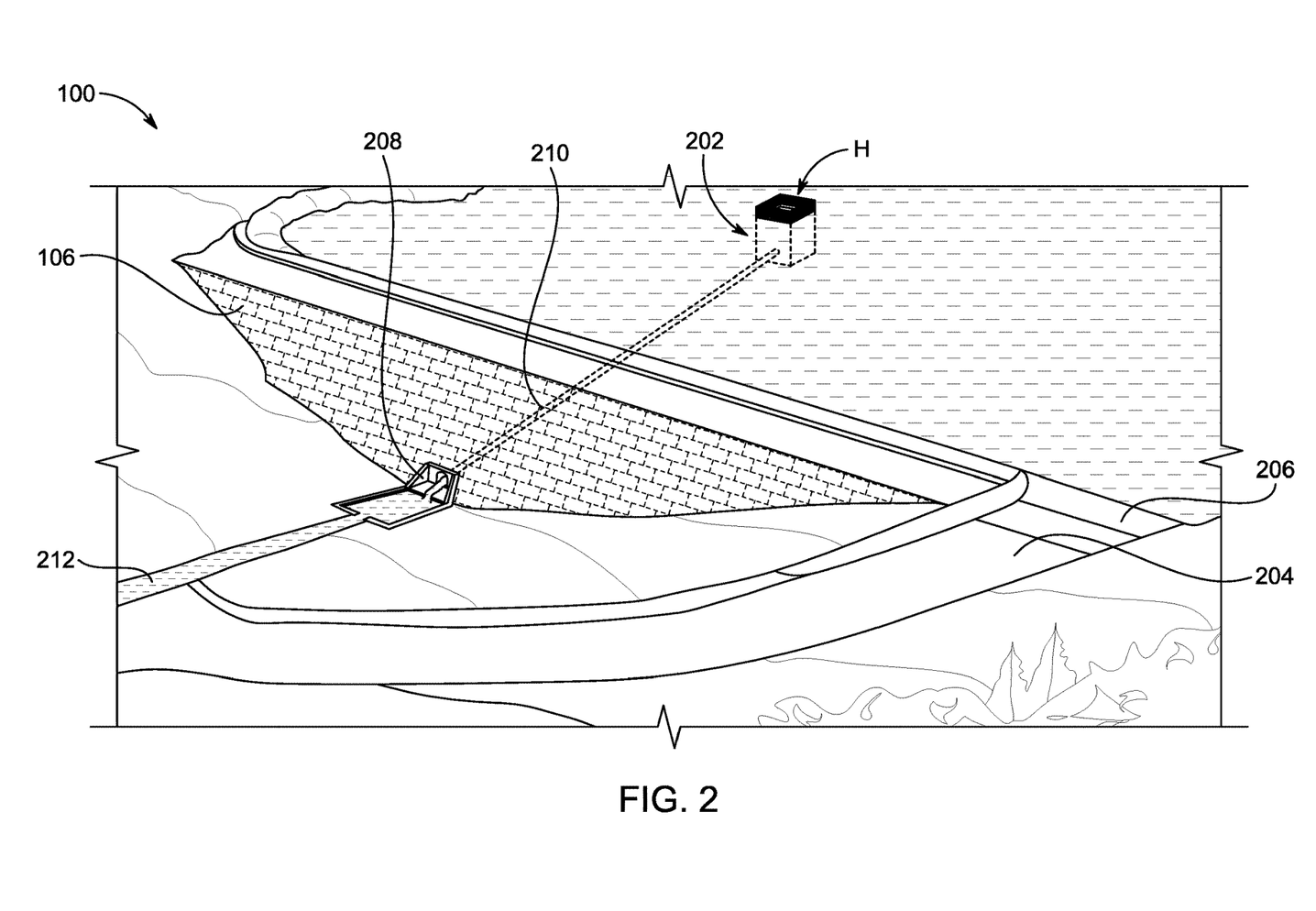
FIG. 2 is an exemplary diagram of the earthen dam structure having a principal spillway and an emergency spillway, according to certain embodiments of the present disclosure.

Referring to FIG. 2, an exemplary diagram of the earthen dam structure 100 having a principal spillway 202 and an emergency spillway 204 is shown. The principal spillway 202 and the emergency spillway 204 are both configured to prevent water from overtopping the earthen dam structure 100. The principal spillway 202 includes a raised structure extending from a bottom of a water reservoir. A height of the raised structure can be set below a safe water level. The principal spillway 202 is connected to a canal opening 208 via a flow pathway 210. When a level of the water increases due to, for example, unusually heavy rainfall, the principal spillway 202 directs the water to a channel 212 through the flow pathway 210. Further increase in the level of water may be directed to the channel 212 via the emergency spillway 204. As such, the principal spillway 202 and the emergency spillway 204 are often adequate to maintain the level of water below the top side 112 (also referred to as "crest") of the core wall 104 with a safe distance from the top side 112 and prevent overtopping of the earthen dam structure 100. Although an outflow capacity of the spillways can be increased by widening the floor 206 of the emergency spillway 204 and increasing the height "H" to minimize the likelihood of the overtopping, it is often prohibitive to do so because of economic, terrain, or land development considerations. In other embodiments, the earthen dam structure 100 may have a different number of spillways and/or a different configuration of spillways.

Figure 3:
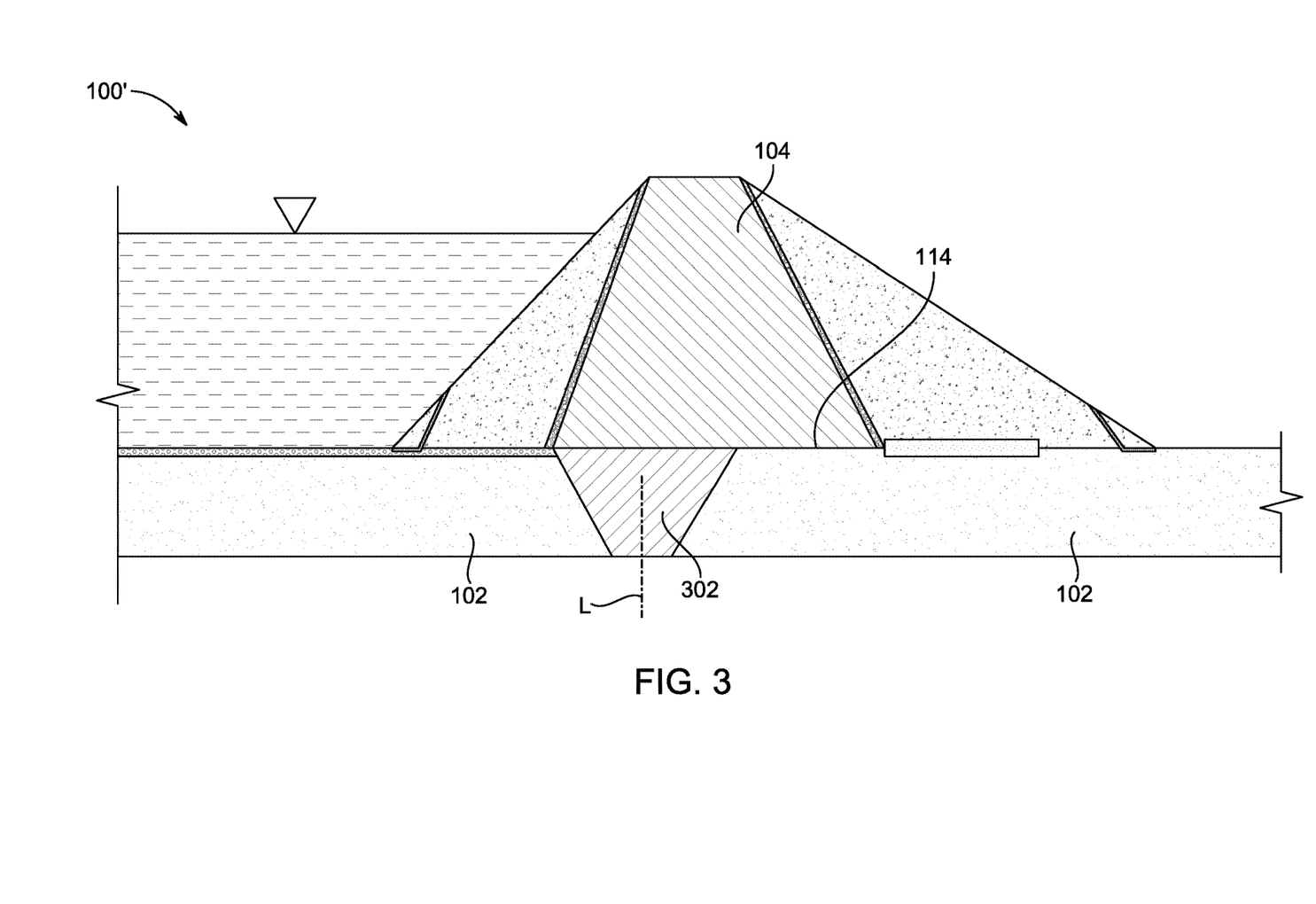
FIG. 3 is an exemplary cross-sectional view of an earthen dam structure with a different configuration of a cut-off trench, according to certain embodiments of the present disclosure.

FIG. 3 illustrates an exemplary cross-sectional view of the earthen dam structure 100' with a different configuration of a cut-off trench 302. Since the embodiment of the earthen dam structure 100' is similar to the embodiment of the earthen dam structure 100, explanations will be given with emphasis placed on differences. In some embodiments, the cut-off trench 302 may be formed to contact a portion of the bottom side 114 of the core wall 104. In one example, a top of the cut-off trench 302 may contact only about 50% of the bottom side 114 of the core wall 104. In another example, the top of the cut-off trench 302 may contact about 75% to about 80% of the bottom side 114 of the core wall 104. In another embodiment, the top of the cut-off trench 302 may also contact a bottom of the upstream embankment portion 108 (not shown). In all these example embodiments, the center line "L" lies within the bottom side 114 of the core wall 104.

Figure 4:
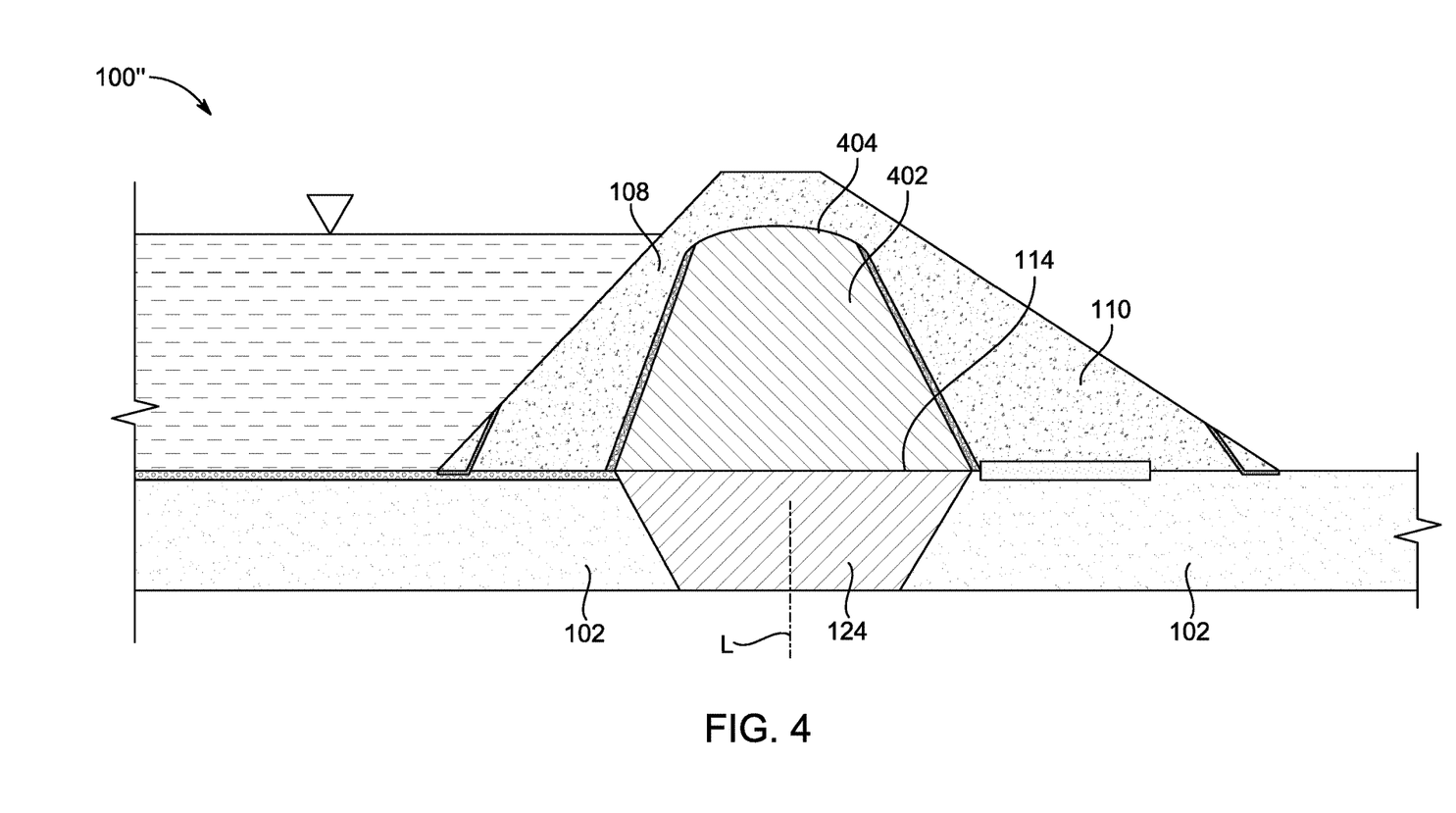
FIG. 4 is an exemplary cross-sectional view of an earthen dam structure with a different configuration of a core wall, according to certain embodiments of the present disclosure.

FIG. 4 illustrates an exemplary cross-sectional view of the earthen dam structure 100" with a different configuration of a core wall 402. Since the embodiment of the earthen dam structure 100″ is similar to the embodiment of the earthen dam structure 100, explanations will be given with emphasis placed on differences. In an embodiment, at least one of the upstream embankment portion 108 and the downstream embankment portion 110 covers a crest 404 of the core wall 402. As used herein, the term "crest" refers to a top portion of the core wall, which corresponds to the top side 112 in FIG. 1. In the example of FIG. 4, the crest 404 of the core wall 402 is covered by one of or both of the upstream embankment portion 108 and the downstream embankment portion 110.

To this end, the earthen dam structure (e.g. 100, 100′ and 100″) of the present disclosure can offer various advantages. For example, the low unit weight of the constituents on the clay bricks 106 allows easy handling of the clay bricks 106, such as transporting, thereby rending the bricks economical. The elasticity developed in the core wall 104 by virtue of the powdered tire rubber and other components may reduce vibrations arising from earthquakes. Low hydraulic conductivity and low permeability property of the clay bricks 106 make it suitable for building the core wall 104 of the earthen dam structure (e.g. 100, 100′ and 100″) and other landfills liners. Further, the use of a mixture of sand, bentonite, powdered tire rubber, and cementing agent in the liner system 128 isolates leachate or solid toxic wastes from the environment. Therefore, the present disclosure provides a cost-effective alternative to conventionally used costly materials for building a core wall.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An earthen dam structure, comprising:
    a core wall including a homogeneous mixture of clay, sand, powdered tire rubber and Portland cement, and the core wall contains the powdered tire rubber in an amount sufficient to increase a modulus of elasticity of the core wall to over 10 MPa while keeping a hydraulic conductivity of the core wall under 100 feet/year;
    an upstream embankment portion positioned adjacent to the core wall;
    a downstream embankment portion positioned adjacent to the core wall, wherein the core wall is arranged between the upstream embankment portion and the downstream embankment portion;
    a spillway configured to prevent water from overtopping a crest of the core wall; and
    a liner system adjacent to the core wall, wherein the liner system comprises sand, bentonite, powdered tire rubber, lime and fly ash.

2. The earthen dam structure of claim 1, wherein the core wall comprises a plurality of stacked clay bricks that comprise clay, sand, powdered tire rubber and Portland cement.

3. The earthen dam structure of claim 2, wherein the plurality of clay bricks is formed by a stiff mud process.

4. The earthen dam structure of claim 3, wherein the stiff mud process comprises:
    forcing a clay mixture through a die to form a continuous clay band, the clay mixture including 15-30 wt % of powdered tire rubber, 10-15 wt % of Portland cement and mud that has a clay content of 50-70 wt %;
    cutting the continuous clay band into separate clay bricks;
    drying the separate clay bricks below a degradation temperature of the powdered tire rubber to form dried clay bricks;
    baking the dried clay bricks below the degradation temperature of the powdered tire rubber to form hardened clay bricks; and
    cooling the hardened clay bricks to form the plurality of clay bricks.

5. The earthen dam structure of claim 4, wherein forming the plurality of clay bricks further comprises:
    drying the separate clay bricks at a temperature of 45-150° C. for 24-48 hours; and
    baking the dried clay bricks at about 200° C. for 6 to 9 hours under a pressure of 1.2 MPa to 1.6 MPa in an autoclaving boiler.

6. The earthen dam structure of claim 2, wherein:
    the clay has a weight fraction of 60-70% in the plurality of clay bricks,
    the powdered tire rubber has a weight fraction of 15-30% in the plurality of clay bricks, and
    the Portland cement has a weight fraction of 10-15% in the plurality of clay bricks.

7. The earthen dam structure of claim 1, wherein:
    the sand has a weight fraction of 10-15% in the liner system,
    the bentonite has a weight fraction of 40-60% in the liner system,
    the powdered tire rubber has a weight fraction of 10-20% in the liner system,
    the lime has a weight fraction of 5-10% in the liner system, and
    the fly ash has a weight fraction of 10-30% in the liner system.

8. The earthen dam structure of claim 1, wherein the core wall has a trapezoid shape in a vertical cross section, where:
    the trapezoid shape has a top side, a bottom side, a left side, and a right side,
    the top side is parallel to the bottom side, and
    the top side is shorter than the bottom side.

9. The earthen dam structure of claim 8, wherein:
    the top side has a length of about 5 meters,
    the left side has a slope of 0.1 to 0.3, and
    the right side has a slope of 0.1 to 0.3.

10. The earthen dam structure of claim 9, wherein:
    the upstream embankment portion has a slope of about 3, and
    the downstream embankment portion has a slope of about 2.5.

11. The earthen dam structure of claim 1, wherein the core wall is positioned in a center of the earthen dam structure or upstream from the center of the earthen dam structure.

12. The earthen dam structure of claim 1, further comprising:
    a first transition filter between the upstream embankment portion and the core wall; and
    a second transition filter between the downstream embankment portion and the core wall.

13. The earthen dam structure of claim 1, further comprising a foundation section including soil.

14. The earthen dam structure of claim 13, further comprising a horizontal blanket between the foundation section and the upstream embankment portion, wherein the horizontal blanket is connected to the core wall and configured to reduce seepage through the foundation section.

15. The earthen dam structure of claim 13, further comprising a cut-off trench configured to reduce seepage through the foundation section, wherein a center line of the cut-off trench is within a base of the core wall.

16. The earthen dam structure of claim 15, wherein the cut-off trench extends into the foundation section.

17. The earthen dam structure of claim 1, wherein at least one of the upstream embankment portion and the downstream embankment portion covers a crest of the core wall.

18. An earthen dam structure, comprising:
- a core wall including a homogeneous mixture of clay, sand, powdered tire rubber and Portland cement, and the core wall contains the powdered tire rubber in an amount sufficient to increase a modulus of elasticity of the core wall to over 10 MPa while keeping a hydraulic conductivity of the core wall under 100 feet/year;
- an upstream embankment portion positioned adjacent to the core wall;
- a downstream embankment portion positioned adjacent to the core wall, wherein the core wall is arranged between the upstream embankment portion and the downstream embankment portion; and
- a spillway configured to prevent water from overtopping a crest of the core wall;

wherein:
- the clay has a weight fraction of 50-60% in the core wall,
- the sand has a weight fraction of 10-15% in the core wall,
- the powdered tire rubber has a weight fraction of 15-30% in the core wall, and
- the Portland cement has a weight fraction of 10-15% in the core wall.

* * * * *